United States Patent
Yoo

(10) Patent No.: US 9,407,188 B2
(45) Date of Patent: Aug. 2, 2016

(54) SENSORLESS VECTOR CONTROL APPARATUS FOR INDUCTION MOTOR

(71) Applicant: LSIS CO., LTD., Anyang-si, Gyeonggi-do (KR)

(72) Inventor: Anno Yoo, Seoul (KR)

(73) Assignee: LSIS CO., LTD., Anyang-si (KR)

( * ) Notice: Subject to any disclaimer, the term of this patent is extended or adjusted under 35 U.S.C. 154(b) by 45 days.

(21) Appl. No.: 14/226,453

(22) Filed: Mar. 26, 2014

(65) Prior Publication Data
US 2014/0300309 A1   Oct. 9, 2014

(30) Foreign Application Priority Data

Apr. 4, 2013   (KR) .................. 10-2013-0036746

(51) Int. Cl.
*H02P 21/00* (2016.01)

(52) U.S. Cl.
CPC ........ *H02P 21/0039* (2013.01); *H02P 21/0035* (2013.01)

(58) Field of Classification Search
CPC ... H02P 21/0035; H02P 21/06; H02P 21/146; Y02T 10/643
USPC .............................. 318/400.02, 727, 799, 800
See application file for complete search history.

(56) References Cited

U.S. PATENT DOCUMENTS

| | | | | |
|---|---|---|---|---|
| 5,585,709 A | * | 12/1996 | Jansen | H02K 17/165 318/720 |
| 6,069,467 A | * | 5/2000 | Jansen | H02P 6/183 318/801 |
| 6,137,258 A | * | 10/2000 | Jansen | H02P 6/185 318/802 |
| 6,281,659 B1 | * | 8/2001 | Giuseppe | H02P 21/0042 318/727 |
| 6,335,605 B1 | | 1/2002 | Negoro | |

(Continued)

FOREIGN PATENT DOCUMENTS

| | | |
|---|---|---|
| CN | 102170261 | 8/2011 |
| CN | 102487264 | 6/2012 |

(Continued)

OTHER PUBLICATIONS

European Patent Office Application No. 14162325.6, Search Report dated Apr. 19, 2016, 10 pages.

(Continued)

*Primary Examiner* — Rina Duda
(74) *Attorney, Agent, or Firm* — Lee, Hong, Degerman, Kang & Waimey PC; Jonathan Kang; Justin Lee

(57) ABSTRACT

A sensor-less vector control apparatus for induction motor enhanced in performance of sensor-less vector control by estimating changes in parameters in real time is provided, the apparatus including a current controller, a first phase converting unit, a second phase converting unit, a rotor speed and position estimator configured to measure a rotor speed of a rotor and a rotor flux using an output value of the first phase converting unit and to estimate a rotor position using the output value, and a stator resistance and angle error estimator configured to calculate a stator resistance and an angle error of the induction motor by receiving d, q axis current commands on the synchronous reference frame inputted from the current controller and d, q voltages on the synchronous reference frame outputted from the current controller, and to provide the stator resistance to the rotor speed and position estimator.

7 Claims, 5 Drawing Sheets

(56) References Cited

U.S. PATENT DOCUMENTS

| | | | |
|---|---|---|---|
| 6,636,012 B2 * | 10/2003 | Royak | H02P 6/185 318/490 |
| 6,924,617 B2 * | 8/2005 | Schulz | H02P 6/18 318/610 |
| 8,030,788 B2 * | 10/2011 | Xu | F01D 15/10 290/31 |
| 2003/0062870 A1 | 4/2003 | Royak et al. | |

FOREIGN PATENT DOCUMENTS

| | | |
|---|---|---|
| JP | 07-075399 | 3/1995 |
| JP | 11-341898 | 12/1999 |
| JP | 2000-095453 | 4/2000 |
| JP | 2005-020817 | 1/2005 |
| JP | 2011-176975 | 9/2011 |

OTHER PUBLICATIONS

D. Sleeva Reddy, et al., "Online Estimation of Rotor Time Constant and Speed for Vector Controlled Induction Motor Drive With Model Reference Adaptive Controller (MRAC)", International Journal of Engineering Research and Applications, ISSN: 2248-9622, vol. 2, Issue 6, Dec. 2012, 8 pages.

Ba-razzouck, et al. "Real Time Implementation of a Rotor Time-Constant Online Estimation Scheme", Industrial Electronics Society, vol. 2, Nov. 1999, 6 pages.

* cited by examiner

SENSORLESS VECTOR CONTROL APPARATUS FOR INDUCTION MOTOR

CROSS REFERENCE TO RELATED APPLICATION

Pursuant to 35 U.S.C. §119 (a), this application claims the benefit of earlier filing date and right of priority to Korean Patent Application No. 10-2013-0036746, filed on Apr. 4, 2013, the contents of which are hereby incorporated by reference in their entirety.

BACKGROUND OF THE INVENTION

1. Field of the Invention

The present disclosure relates to a control apparatus for induction motor, and more particularly, to a sensor-less vector control apparatus for induction motor including a method for estimating a change in a parameter of an induction motor in real time during sensor-less vector operation.

2. Description of Related Art

Generally, an induction motor includes a stator wound with a winding and a rotor formed by aluminum conductor or iron core. The induction motor is a machine configured to obtain a rotational force by generating a periodic change in current of a winding mounted on a stator, and generating a torque on a rotor according to a constant change in a magnetic field in response to the current change.

In general, a general-purpose inverter is commonly used to drive 3-phase induction motor, and in particular, a general-purpose inverter is commonly used in a variable speed driving field using an induction motor, a hoisting load, or a traction load of an electric vehicle. Operations of an induction motor is generally implemented based on vector control or FOC (Field Oriented Control) algorithm, and a position sensor-less vector control using no position sensor is largely used as a control method for an induction motor in such application fields as where there is a restraint in space or where reduced cost in system is required.

However, among parameters of a squirrel case induction machine, stator resistance and rotor resistance values are changed due to internal electric circuits when a temperature within the induction motor is changed in response to a change in a load and a speed, and an increased temperature of an induction motor leads to change in stator resistance. Vector control commonly used as an induction motor driving method is significantly dependent upon a motor parameter, so fluctuation of the rotor resistance degrades control performance.

SUMMARY OF THE INVENTION

Exemplary aspects of the present disclosure are to substantially solve at least the above problems and/or disadvantages and to provide at least the advantages as mentioned below. Thus, the present disclosure is directed to provide a sensor-less vector control apparatus for induction motor capable of enhancing sensor-less vector control performance by estimating a change in a parameter of an induction motor in real time.

In one general aspect of the present invention, there is provided a sensor-less vector control apparatus for induction motor (hereinafter referred to as "apparatus"), the apparatus comprising:

a current controller configured to output d and q-axis voltages in a synchronous reference frame, using d and q-axis current references in the synchronous reference frame;

a first phase converting unit configured to convert output voltages from the current controller into voltages in a stationary reference frame;

an inverter configured to apply voltages to an induction motor by receiving the output of the first phase converting unit;

a second phase converting unit configured to convert phase currents measured based on the voltages applied to the induction motor from the inverter into d and q-axis currents in the synchronous reference frame;

a rotor speed and position estimator configured to measure a rotor speed and a rotor magnetic flux of the induction motor and estimate a rotor position by using the phase currents and an output value of the first phase converting unit and to estimate a rotor position using the output value; and a stator resistance and angle error estimator configured to calculate a stator resistance and an angle error of the induction motor by receiving d, q axis current commands on the synchronous reference frame inputted from the current controller and d, q voltages on the synchronous reference frame outputted from the current controller, and to provide the stator resistance to the rotor speed and position estimator.

Preferably, but not necessarily, the apparatus may further comprise a current measurer for each phase configured to measure phase currents applied to the induction motor using an output voltage of the inverter.

Preferably, but not necessarily, the apparatus may further comprise a first magnetic flux angle compensator configured to compensate a rotor magnetic flux angle used by the first phase converting unit by using each error provided by the stator resistance and angle error estimator.

Preferably, but not necessarily, the apparatus may further comprise a second magnetic flux angle compensator configured to compensate a rotor magnetic flux angle used by the second phase converting unit by using each error provided by the stator resistance and angle error estimator.

Preferably, but not necessarily, the stator resistance and angle error estimator may include an angle speed error estimator configured to estimate angle speed error of the induction motor using an output voltage of the current controller and a feedback current applied from the second phase converting unit to the current controller, and a stator resistance estimator configured to estimate in real time a stator resistance value using an output voltage of the current controller and a feedback current applied from the second phase converting unit to the current controller.

Preferably, but not necessarily, the stator resistance and angle error estimator may further include a first switch configured to selectively provide an angular speed error estimated by the angle speed error estimator, a compensator configured to determine an angular speed compensation amount determined by the angular speed error provided by the first switch, an integrator configured to calculate an angular error from the angular speed compensation amount which is an output of the compensator, and a second switch configured to selectively provide a stator resistance value provided by the stator resistance estimator to the rotor speed and position estimator.

Preferably, but not necessarily, the apparatus may further comprise a speed controller configured to output a q axis current command on the synchronous reference frame to the current controller by inputting a rotor speed command and rotor speed of the induction motor.

In an advantageous effect, the sensor-less vector control apparatus for induction motor thus described is such that a real time estimation and an angle error compensation can be accomplished using a feed-forward of a current controller and an integrator output voltage of the current controller. The method proposed by the present disclosure is advantageously simple in that performance of dynamic characteristic is very fast and no special operation mode is required due to determination of performance by a control bandwidth of a current controller having the fastest dynamic characteristic in a control system.

DETAILED DESCRIPTION OF THE INVENTION

Now, exemplary embodiments of the present disclosure will be explained in detail together with the figures to allow a person of ordinary skill in the art to easily appreciate the technical idea of the present disclosure The present disclosure relates to real time parameter estimation in a sensor-less vector control of an induction motor, and more particularly to an estimator design appropriate to stator resistance estimation and angle error compensation.

Figure 1:
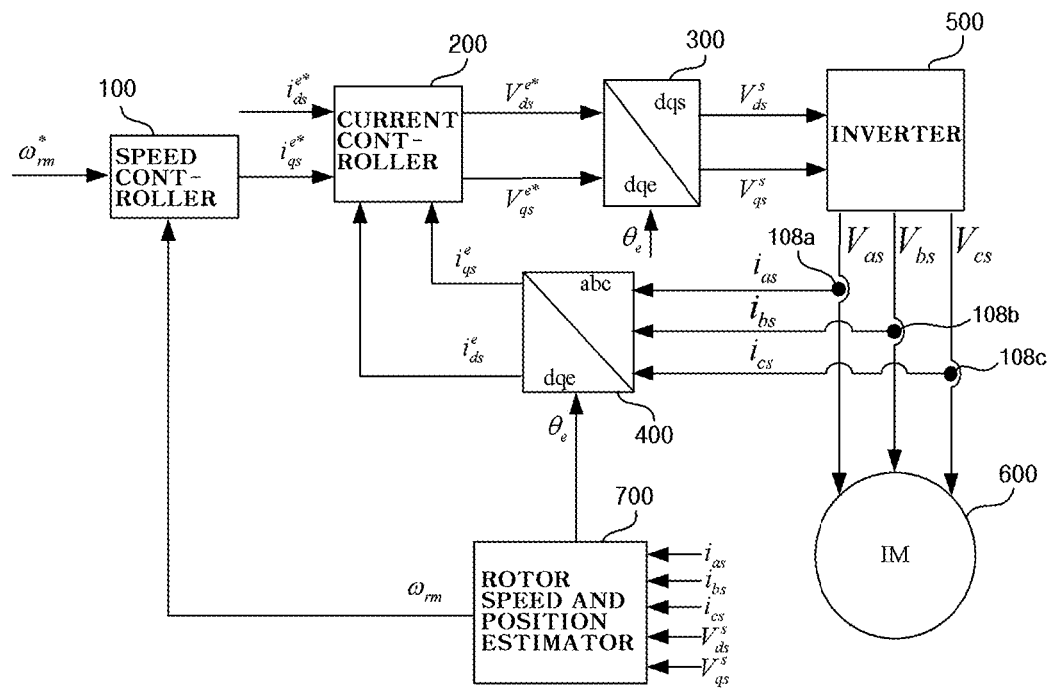
FIG. 1 is a block diagram illustrating a configuration of a induction motor system according to the present disclosure.

FIG. 1 is a block diagram illustrating a configuration of an induction motor system according to the present disclosure, and particularly illustrating a configuration of an induction motor controller including a speed control.

A speed controller (100) outputs a q axis current command on a synchronous reference frame by inputting a rotor speed command and an actual rotor speed.

A current control (200) outputs d, q axis voltages on the synchronous reference frame from d, q axis current commands on the synchronous reference frame and actual current.

A first phase converting unit (300) is a device configured to convert an output voltage of the current controller (200) to a voltage on a stationary reference frame.

A second phase converting unit (400) is a device configured to convert a motor phase current measured by current measurers (108a, 108b, 108c) to d, q axis currents on the synchronous reference frame, where a piece of current information may be omitted.

An inverter (500) is a voltage inverter which is a device configured to apply a voltage to an induction motor (600).

A rotor speed and position estimator (700) is a device for rotor speed and position estimation, and estimates a rotor speed and a rotor flux of the induction motor using as inputs a motor phase current generated by the current measurers (108a, 108b, 108c) and an output voltage of the first phase converting unit (300).

Figure 2:
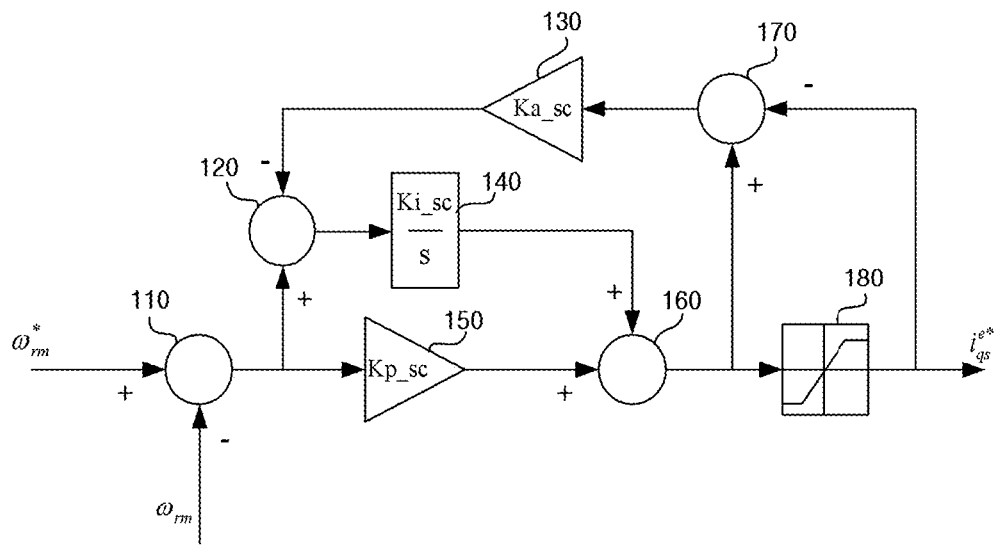
FIG. 2 is a block diagram illustrating a configuration of a speed controller illustrated in FIG. 1.

FIG. 2 is a block diagram illustrating a configuration of a speed controller illustrated in FIG. 1. Referring to FIG. 2, a speed controller (100) includes adders (110, 120, 160, 170), a limiter (180), a gaining unit (130), and proportional-integral controllers (140,150).

The speed controller (100) outputs a q axis current command using the proportional-integral controllers (140, 150) configured to input a difference between a command speed (or a speed reference) and an actual speed (or a feedback speed).

The proportional-integral controllers (140,150) for speed control output an input signal by integrating the input signal, and the limiter (180) limits an output from the speed controller (100).

The gaining unit (113) provides an anti-windup gain to prevent divergence of the proportional-integral controllers (140, 150) when the limiter (180) operates. The output of the speed controller (100) is a q axis current on the synchronous reference frame.

Figure 3:
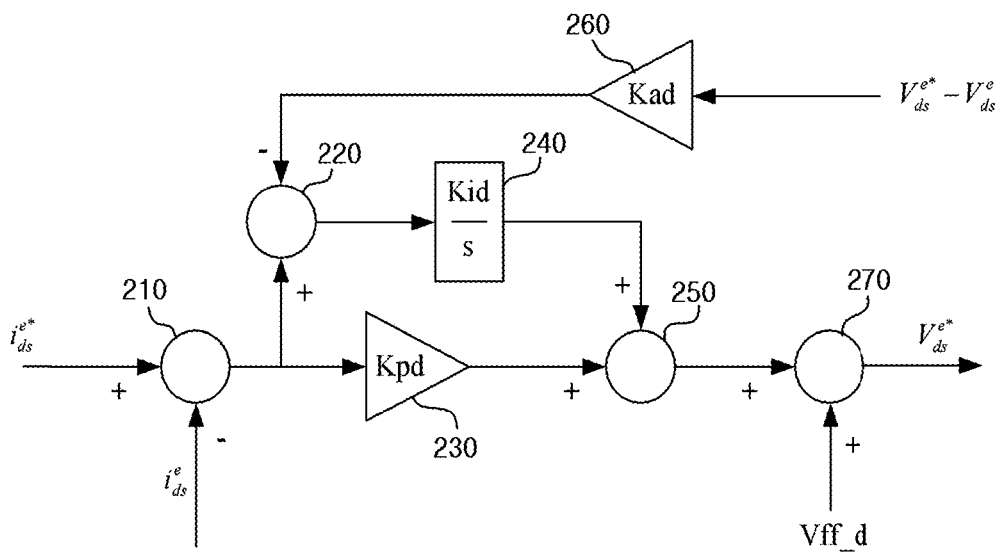
FIGS. 3 and 4 are block diagrams illustrating a configuration of the current controller in FIG. 1.
Figure 4:
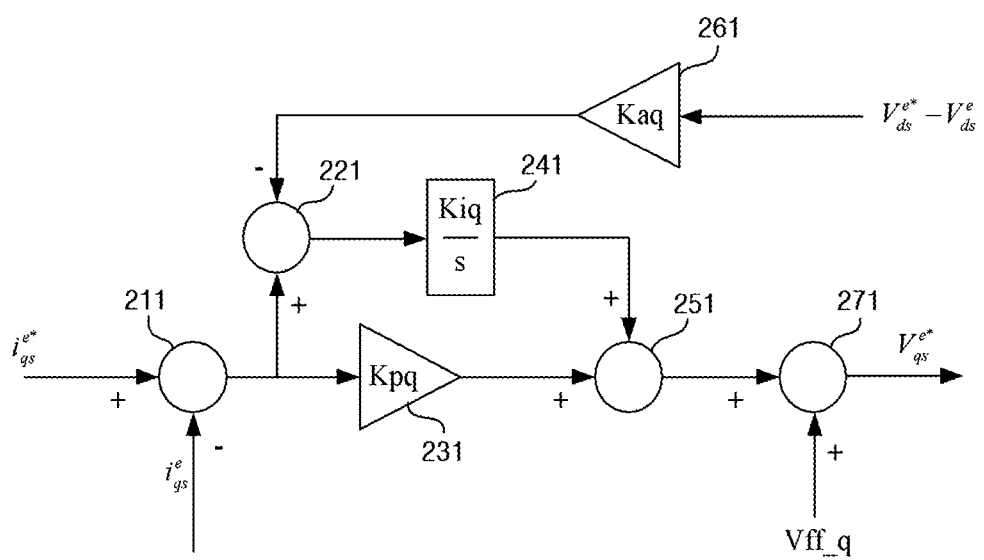

FIGS. 3 and 4 are block diagrams illustrating a detailed configuration of the current controller (200) in FIG. 1, where FIG. 3 illustrates a configuration of a d axis current controller (200) on a synchronous reference frame and FIG. 4 illustrates a configuration of a q axis current controller (200) on the synchronous reference frame.

Referring to FIG. 3, the d axis current controller (200) includes subtractors (210, 220), adders (250, 270), a gaining unit (260), and a proportional-integral controllers (230,240).

Referring to FIG. 4, the q axis current controller (200) includes subtractors (211, 221), adders (251, 271), a gaining unit (261), and a proportional-integral controllers (231,241).

Referring to FIGS. 3 and 4, the d, q axis current controller (200) includes a proportional and integral-type controller configured to respectively control d and q-axis currents in the synchronous reference frame and a feed-forwarding unit.

The proportional-integral controllers (230, 240, 231, 241) perform a proportional-integral gaining operation for current control using a current command and a feedback current. Input signals (Vff_d, Vff_q) are configured to perform a feed-forwarding compensation, and may be variably configured according to modeling of an induction motor.

When an output from the current controller (200) exceeds a magnitude of a voltage synthesizable by the inverter (500), the gaining units (260, 261) obtains an anti-windup gain to prevent divergence of integral controllers (240, 241).

The operation of converting a voltage on a synchronous reference frame which is an output of the current controller (200) of FIG. 1 to a voltage on a stationary reference frame may be defined by the following Equations.

$$V_{ds}^{s}=V_{ds}^{e*}\cos\theta_e - V_{qs}^{e*}\sin\theta_e \qquad (1)$$

$$V_{qs}^{s}=V_{ds}^{e*}\sin\theta_e + V_{qs}^{e*}\cos\theta_e \qquad (2)$$

The first phase converting unit (400) obtains d, q axis currents on a synchronous reference frame from a motor phase current measured by the current measurers (108a, 108b, 108c), which may be expressed by the following Equations.

$$i_{ds}^{s} = \frac{2i_{as} - i_{bs} - i_{cs}}{3} \qquad (3)$$

$$i_{qs}^{s} = \frac{i_{bs} - i_{cs}}{\sqrt{3}} \qquad (4)$$

$$i_{ds}^{e} = i_{ds}^{s}\cos\theta_e + i_{qs}^{s}\sin\theta_e \qquad (5)$$

$$i_{qs}^{e} = -i_{ds}^{s}\sin\theta_e + i_{qs}^{s}\cos\theta_e \qquad (6)$$

Although the rotor speed and position estimator (700) of FIG. 1, which is a configured to grasp rotor speed and position of rotor flux, may be variably configured, methods widely used by the industries may largely include a MRAS (Model Reference Adaptive System) or an ASO (Adaptive Speed Observer).

A rotor flux estimated by using the MRAS method may be expressed by the following Equation.

$$\hat{\lambda}_r^s = \frac{T_c}{1+T_c s}\frac{L_r}{L_m}[V_s^s - (R_s i_s^s + s\sigma L_s i_s^s)] + \frac{1}{1+T_c s}\lambda_r^{s*} \quad (7)$$

where, $V_s^s$ is an applied voltage, $i_s^s$ is a stator resistance, s is a Laplace operator, $R_s$ is a stator resistance, $\sigma L_s$ is an excessive inductance, $L_r$ is a rotor inductance, $L_m$ is a mutual inductance, $\lambda_r^{s*}$ is a reference rotor flux, and $T_c$ is a switch frequency of estimator according to the MRAS method.

Furthermore, a rotor flux estimated by the ASO method may be expressed by the following Equations.

$$\frac{d}{dt}\begin{bmatrix} i_s^s \\ \lambda_r^s \end{bmatrix} = \begin{bmatrix} A_{11} & A_{12} \\ A_{21} & A_{22} \end{bmatrix}\begin{bmatrix} i_s^s \\ \lambda_r^s \end{bmatrix} + \begin{bmatrix} B_1 \\ 0 \end{bmatrix}V_s^s + G(i_s - \hat{i}_s) \quad (8)$$

where, $$A_{11} = -\left\{\frac{R_s}{\sigma L_s} + \frac{1-\sigma}{\sigma T_r}\right\}I = a_{r11}I,$$

$$A_{12} = \frac{L_m}{\sigma L_s L_r}\left\{\frac{1}{T_r}I - \omega_r J\right\} = a_{r12}I + a_{i12}J,$$

$$A_{21} = \frac{L_m}{T_r}I = a_{r21},$$

$$A_{22} = -\frac{1}{T_r}I + \omega_r J = a_{r22}I + a_{i22}J,$$

$$B_1 = \frac{1}{\sigma L_s}I,$$

$$C = [I \ 0],$$

$$I = \begin{bmatrix} 1 & 0 \\ 0 & 1 \end{bmatrix},$$

$$J = \begin{bmatrix} 0 & -1 \\ 1 & 0 \end{bmatrix},$$

$$G = \begin{bmatrix} g_1 & g_2 & g_3 & g_4 \\ -g_2 & g_1 & -g_4 & g_3 \end{bmatrix}^T,$$

$$g_1 = (k-1)(a_{r11} + a_{r22}),$$

$$g_2 = (k-1)a_{i22},$$

$$g_3 = (k^2-1)(ca_{r11} + a_{r21}) - c(k-1)(a_{r11} + a_{r22}),$$

$$g_4 = -c(k-1)a_{i22},$$

$$c = \frac{\sigma L_s L_r}{L_m} \text{ and } T_r$$

is a rotor time constant), $\omega_r$ is an electrical rotor speed), and k is a real number.

As seen from Equations (7) and (8), when the rotor flux is estimated by using the MRAS or ASO method, it can be noted that parameters of the induction motor are included. A slip frequency in an indirect vector control of a conventional induction motor may be expressed by the following Equation 9, and rotor flux and position of the rotor flux may be expressed by the following Equations 10 and 11, respectively.

$$\omega_{sl} = \frac{R_r}{L_r}\frac{i_{qs}^e}{i_{ds}^{e*}} \quad (9)$$

$$\omega_e = \frac{P}{2}\omega_r + \omega_{sl} \quad (10)$$

$$\theta_e = \int \omega_e d\tau \quad (11)$$

where, $\omega_{sl}$ is a slip frequency, $R_r$ is a rotor resistance, and P is a number of poles.

The performance of a sensor-less vector control of an induction motor is dependent on the parameters of the induction motor as shown in the Equations (7) and (8). Particularly, value of stator resistance of an induction motor is changeable in response to an operational status of the induction motor to degrade the estimating performance of rotor flux, resulting in generation of influence on the rotor speed and the estimating performance of rotor flux. Although description has been centered on the MRAS method so far, the method proposed by the present disclosure may be also applicable to the ASO method.

The present disclosure provides a sensor-less vector control apparatus for induction motor configured to enhance a sensor-less vector control performance of the induction motor by estimating a stator resistance in real time and compensating an angle error that appears during the sensor-less vector control, and a driving method thereof.

Figure 5:
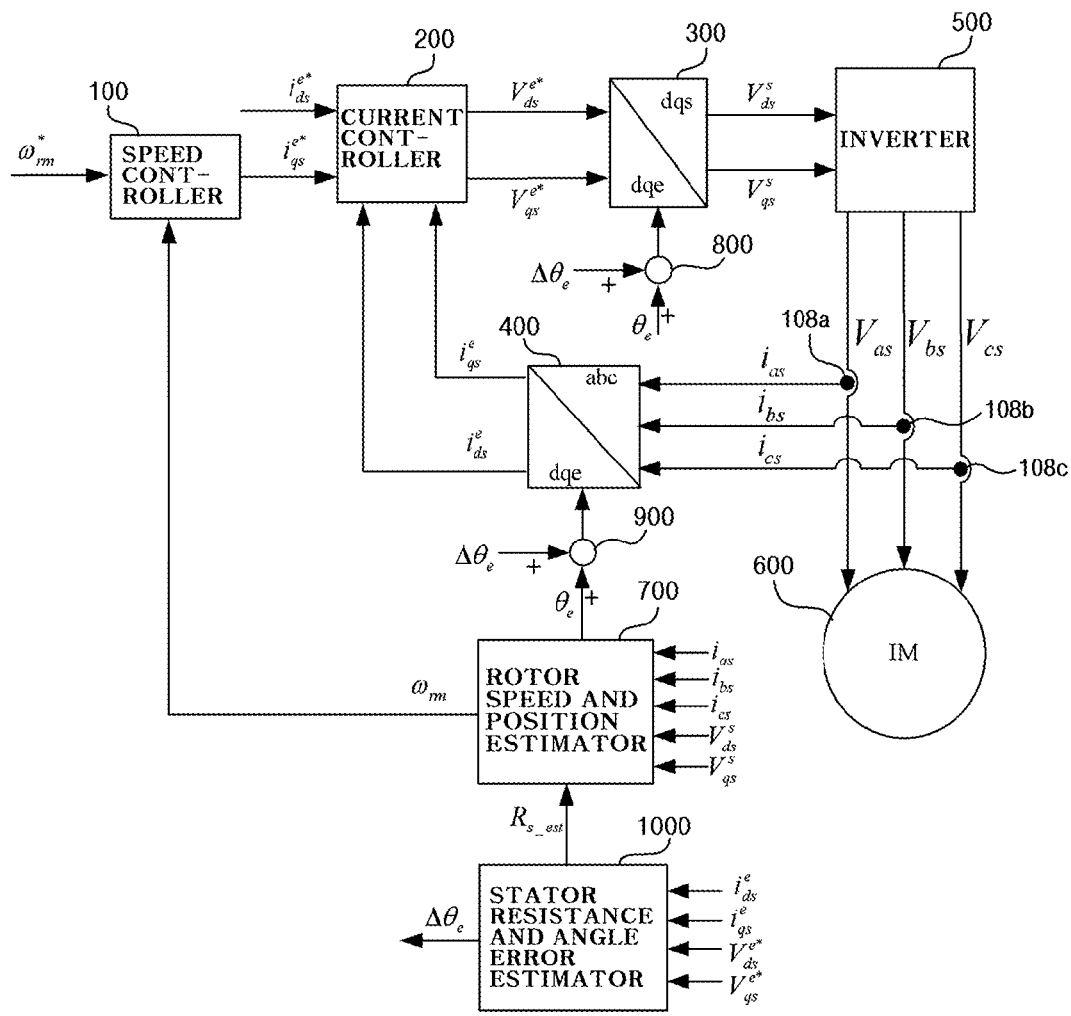
FIG. 5 is a block diagram illustrating a configuration of an induction motor system according to an exemplary embodiment of the present disclosure.

FIG. 5 is a block diagram illustrating a configuration of an induction motor system according to an exemplary embodiment of the present disclosure. FIG. 5 is a block diagram illustrating a configuration of an induction motor system including a stator resistance and an angle error estimator according to the present disclosure.

In describing FIG. 5, like reference numerals will be used for like configurations as in those in FIG. 1.

Referring to FIG. 5, a speed controller (100) outputs a q axis current command on a synchronous reference frame using a rotor speed command and an actual rotor speed as inputs. A current controller (200) outputs d, q voltages on the synchronous reference frame from d, q axis current commands on the synchronous reference frame and an actual current.

A first phase converting unit (300) is a device configured to convert an output voltage of current controller (200) to a voltage on a stationary reference frame.

A second converting unit (400) is a device configured to convert phase currents ($i_{as}$, $i_{bs}$, $i_{cs}$) measured by phase current measurers (108a, 108b, 108c) of inverter to d, q axis currents on the synchronous reference frame.

An inverter (500) is a device configured to apply a voltage to a 3-phase induction motor (600) using a voltage inverter.

A rotor speed and position estimator (700) is a device configured to estimate a rotor position using a rotor speed and rotor flux.

Phase current measurers (108a, 108b, 108c) are devices configured to measure phase currents applied to the induction motor (600).

A stator resistance and angle error estimator (1000) is a device configured to estimate a stator resistance ($R_{s\_est}$) and an angle error ($\Delta\theta_e$).

A magnetic flux compensators (800, 900) are devices configured to compensate a rotor flux angle ($\theta_e$) inputted to the phase converting units (300, 400) using an angle error ($\Delta\theta_e$) estimated by the stator resistance and the angle error estimator (1000).

Figure 6:
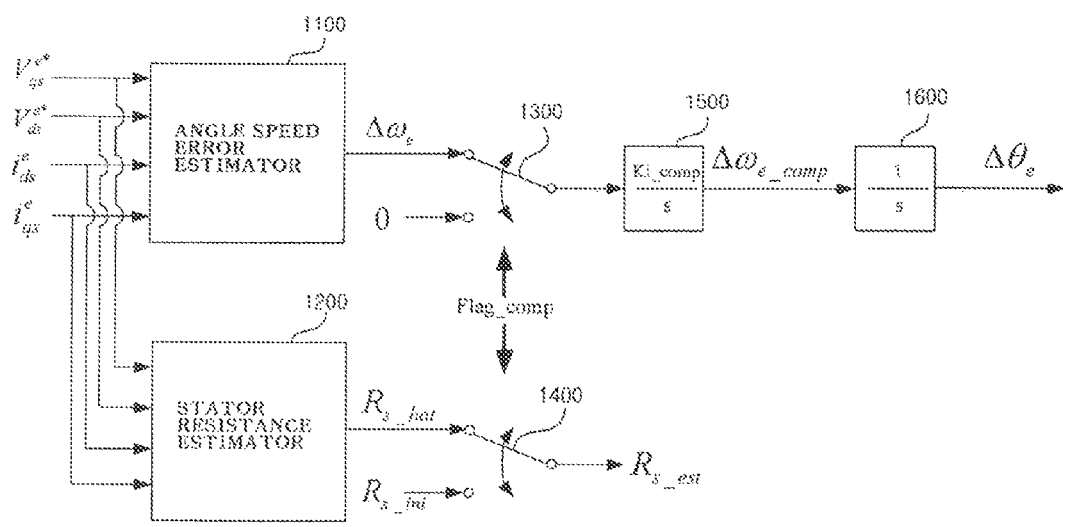
FIG. 6 is a block diagram illustrating a configuration of a stator resistance and angle error estimator illustrated in FIG. 5.

FIG. 6 is a block diagram illustrating a configuration of a stator resistance and angle error estimator illustrated in FIG. 5.

Referring to FIG. 6, the stator resistance and angle error estimator (1000) includes an angle speed error estimator (1100), a stator resistance estimator (1200), switches (1300, 1400), a compensator (1500) and an integrator (1600).

The angle speed error estimator (1100) estimates an angle speed error from an output voltage of d, q axis current controller (200) and a feedback current applied from the second phase converting unit (400) to the current controller (200).

The switch (1300) selectively transmits an output of the angle speed error estimator (110*o*) to the compensator (1500) in response to angle error compensation.

The compensator (1500) determines an angle speed compensation amount and the integrator (1600) calculates angle errors from the angle speed compensation amount which is an output of the compensator (1500). The stator resistance estimator (1200) estimates the stator resistance in real time (online), and estimates an output voltage of the d, q axis current controller (200) and feedback current applied from the second phase converting unit (400) to the current controller (200).

The switch (1400) selectively transmits an output of the stator resistance estimator (1200) in response to calculation time of stator resistance.

Successively, a detailed operation will be described with reference to FIGS. 5 and 6, a voltage equation of induction motor on a general reference frame and a flux equation may be expressed by the following Equations (12) to (19).

$$V_{ds}^{\omega} = R_s i_{ds}^{\omega} + p\lambda_{ds}^{\omega} - \omega\lambda_{qs}^{\omega} \tag{12}$$

$$V_{qs}^{\omega} = R_s i_{qs}^{\omega} + p\lambda_{qs}^{\omega} + \omega\lambda_{ds}^{\omega} \tag{13}$$

$$V_{dr}^{\omega} = 0 = R_r i_{dr}^{\omega} + p\lambda_{dr}^{\omega} - (\omega - \omega_r)\lambda_{qr}^{\omega} \tag{14}$$

$$V_{qr}^{\omega} = 0 = R_r i_{qr}^{\omega} + p\lambda_{qr}^{\omega} + (\omega - \omega_r)\lambda_{dr}^{\omega} \tag{15}$$

$$\lambda_{ds}^{\omega} = L_s i_{ds}^{\omega} + L_m i_{dr}^{\omega} \tag{16}$$

$$\lambda_{qs}^{\omega} = L_s i_{qs}^{\omega} + L_m i_{qr}^{\omega} \tag{17}$$

$$\lambda_{dr}^{\omega} = L_m i_{ds}^{\omega} + L_r i_{dr}^{\omega} \tag{18}$$

$$\lambda_{qr}^{\omega} = L_m i_{qs}^{\omega} + L_r i_{qr}^{\omega} \tag{19}$$

A voltage equation of induction motor on a general reference frame and a flux equation may be expressed as under using the Equations (12) to (19).

$$V_{ds}^{e} = R_s i_{ds}^{e} + p\lambda_{ds}^{e} - \omega_e\lambda_{qs}^{e} \tag{20}$$

$$V_{qs}^{e} = R_s i_{qs}^{e} + p\lambda_{qs}^{e} + \omega_e\lambda_{ds}^{e} \tag{21}$$

$$0 = R_r i_{dr}^{e} + p\lambda_{dr}^{e} - \omega_{sl}\lambda_{qr}^{e} \tag{22}$$

$$0 = R_r i_{qr}^{e} + p\lambda_{qr}^{e} + \omega_{sl}\lambda_{dr}^{e} \tag{23}$$

$$\lambda_{ds}^{e} = L_s i_{ds}^{e} + L_m i_{dr}^{e} \tag{24}$$

$$\lambda_{qs}^{e} = L_s i_{qs}^{e} + L_m i_{qr}^{e} \tag{25}$$

$$\lambda_{dr}^{e} = L_m i_{ds}^{e} + L_r i_{dr}^{e} \tag{26}$$

$$\lambda_{qr}^{e} = L_m i_{qs}^{e} + L_r i_{qr}^{e} \tag{27}$$

Furthermore, a stator flux may be expressed by the following Equations using the rotor flux and rotor current.

$$\lambda_{ds}^{e} = \sigma L_s i_{ds}^{e} + \frac{L_m}{L_r}\lambda_{dr}^{e} \tag{28}$$

$$\lambda_{qs}^{e} = \sigma L_s i_{qs}^{e} + \frac{L_m}{L_r}\lambda_{qr}^{e} \tag{29}$$

A voltage equation of rotor may be expressed as under.

$$p\lambda_{dr}^{e} = R_r\frac{L_m}{L_r}i_{ds}^{e} - \frac{R_r}{L_r}\lambda_{dr}^{e} + (\omega_e - \omega_r)\lambda_{qr}^{e} \tag{30}$$

$$p\lambda_{qr}^{e} = R_r\frac{L_m}{L_r}i_{qs}^{e} - \frac{R_r}{L_r}\lambda_{qr}^{e} - (\omega_e - \omega_r)\lambda_{dr}^{e} \tag{31}$$

Still furthermore, d. q axis equation on the synchronous reference frame at the stator side of the induction motor may be expressed as below.

$$V_{ds}^{e} = \left(R_s + R_r\frac{L_m^2}{L_r^2}\right)i_{ds}^{e} + \sigma L_s\frac{di_{ds}^{e}}{dt} - \omega_e\sigma L_s i_{qs}^{e} - R_r\frac{L_m}{L_r^2}\lambda_{dr}^{e} \tag{33}$$

$$V_{qs}^{e} = \left(R_s + R_r\frac{L_m^2}{L_r^2}\right)i_{qs}^{e} + \sigma L_s\frac{di_{qs}^{e}}{dt} + \omega_r L_s i_{ds}^{e} + \frac{R_r}{L_r}\sigma L_s i_{qs}^{e} \tag{34}$$

The Equations (33) and (34) may be equivalently defined as below.

$$V_{ds}^{e} = R_s i_{ds}^{e} + \sigma L_s\frac{di_{ds}^{e}}{dt} - \omega_e\sigma L_s i_{qs}^{e} \tag{35}$$

$$V_{qs}^{e} = R_s i_{qs}^{e} + \sigma L_s\frac{di_{qs}^{e}}{dt} + \omega_e L_s i_{ds}^{e} \tag{36}$$

Furthermore, when a sensor-less vector control is smoothly performed, and a current control is performed under a steady state, outputs of the current controller may be respectively expressed as under.

$$V_{ds\_out}^{e} = \left(K_p + \frac{K_I}{s}\right)(i_{ds}^{e*} - i_{ds}^{e}) + V_{ds\_ff}^{e} \tag{38}$$

$$V_{qs\_out}^{e} = \left(K_p + \frac{K_I}{s}\right)(i_{qs}^{e*} - i_{qs}^{e}) + V_{qs\_ff}^{e} \tag{39}$$

where however, a feed-forward may be obtained by the following Equations.

$$V_{ds\_ff}^{e} = -\hat{\omega}_e\sigma L_s i_{qs}^{e} \tag{40}$$

$$V_{qs\_ff}^{e} = \hat{\omega}_e L_s i_{ds}^{e} \tag{41}$$

When a current control is smoothly performed, the following conditions may be satisfied from the following Equations (35) to (39).

$$V_{ds}^{e} = V_{ds\_out}^{e} \tag{42}$$

$$V_{qs}^{e} = V_{qs\_out}^{e} \tag{43}$$

At this time, assuming that inductance information is correct, voltages of d, q axis current controller under a steady state will be expressed in the following manners.

$$\left(K_P + \frac{K_I}{s}\right)(i_{ds}^{e*} - i_{ds}^{e}) \cong \frac{K_I}{s}(i_{ds}^{e*} - i_{ds}^{e}) = R_s i_{ds}^{e} - \omega_e \sigma L_s i_{qs}^{e} + \hat{\omega}_e \sigma L_s i_{qs}^{e} \quad (44)$$

$$\left(K_P + \frac{K_I}{s}\right)(i_{qs}^{e*} - i_{qs}^{e}) \cong \frac{K_I}{s}(i_{qs}^{e*} - i_{qs}^{e}) = R_s i_{qs}^{e} + \omega_e L_s i_{ds}^{e} + \hat{\omega}_e L_s i_{ds}^{e} \quad (45)$$

Equations (44) and (45) may be defined as under.

$$\frac{K_I}{s}(i_{ds}^{e*} - i_{ds}^{e}) = R_s i_{ds}^{e} - \omega_e \sigma L_s i_{qs}^{e} + \hat{\omega}_e \sigma L_s i_{qs}^{e} = R_s i_{ds}^{e} + \Delta\omega_e \sigma L_s i_{qs}^{e} \quad (46)$$

$$\frac{K_I}{s}(i_{qs}^{e*} - i_{qs}^{e}) = R_s i_{qs}^{e} + \omega_e L_s i_{ds}^{e} - \hat{\omega}_e L_s i_{ds}^{e} = R_s i_{qs}^{e} - \Delta\omega_e L_s i_{ds}^{e} \quad (47)$$

which may be substituted by the following equations.

$$\frac{K_I}{s}(i_{ds}^{e*} - i_{ds}^{e}) = M \quad (48)$$

$$\frac{K_I}{s}(i_{qs}^{e*} - i_{qs}^{e}) = N \quad (49)$$

An angle error may be obtained from the above Equations in the following manner.

$$\Delta\omega_e = \frac{M i_{qs}^{e} - N i_{ds}^{e}}{\sigma L_s (i_{qs}^{e})^2 + L_s (i_{ds}^{e})^2} \quad (50)$$

The compensator (1500) of FIG. 6 may be operated until when a value as obtained by the Equation (50) becomes zero, and the integrator (1500) calculates the angle error. At this time, the stator resistance estimator may have two outputs as under.

$$R_{s\_hat} = \frac{M}{i_{ds}^{e}} \quad (51)$$

$$R_{s\_hat} = \frac{N}{i_{qs}^{e}} \quad (52)$$

One of the stator resistances obtained from the Equations (51) and (52) may be selected and used as a stator resistance value.

As apparent from the foregoing, the sensor-less vector control apparatus for induction motor thus described is such that a real time estimation and an angle error compensation can be accomplished using a feed-forward of a current controller and an integrator output voltage of the current controller. The method proposed by the present disclosure is simple in that performance of dynamic characteristic is very fast and no special operation mode is required due to determination of performance by a control bandwidth of a current controller having the fastest dynamic characteristic in a control system.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A sensor-less vector control apparatus for induction motor, the apparatus comprising:
   a current controller configured to output d and q-axis voltages in a synchronous reference frame, using d and q-axis current references in the synchronous reference frame;
   a first phase converting unit configured to convert output voltages from the current controller into voltages in a stationary reference frame;
   an inverter configured to apply voltages to an induction motor by receiving the output of the first phase converting unit;
   a second phase converting unit configured to convert phase currents measured based on the voltages applied to the induction motor from the inverter into d and q-axis currents in the synchronous reference frame;
   a rotor speed and position estimator configured to measure a rotor speed and a rotor magnetic flux of the induction motor and estimate a rotor position by using the phase currents and an output value of the first phase converting unit and to estimate a rotor position using the output value; and
   a stator resistance and angle error estimator configured to calculate a stator resistance and an angle error of the induction motor by receiving d, q axis current commands on the synchronous reference frame inputted from the current controller and d, q voltages on the synchronous reference frame outputted from the current controller, and to provide the stator resistance to the rotor speed and position estimator.

2. The apparatus of claim 1, further comprising a current measurer for each phase configured to measure phase currents applied to the induction motor using an output voltage of the inverter.

3. The apparatus of claim 1, further comprising a first magnetic flux angle compensator configured to compensate a rotor magnetic flux angle used by the first phase converting unit by using each error provided by the stator resistance and angle error estimator.

4. The apparatus of claim 1, further comprising a second magnetic flux angle compensator configured to compensate a rotor magnetic flux angle used by the second phase converting unit by using each error provided by the stator resistance and angle error estimator.

5. The apparatus of claim 1, wherein the stator resistance and angle error estimator includes:
   an angle speed error estimator configured to estimate angle speed error of the induction motor using an output voltage of the current controller and a feedback current applied from the second phase converting unit to the current controller, and
   a stator resistance estimator configured to estimate in real time a stator resistance value using an output voltage of the current controller and a feedback current applied from the second phase converting unit to the current controller.

6. The apparatus of claim 5, wherein the stator resistance and angle error estimator further includes:
   a first switch configured to selectively provide an angular speed error estimated by the angle speed error estimator,
   a compensator configured to determine an angular speed compensation amount determined by the angular speed error provided by the first switch,
   an integrator configured to calculate an angular error from the angular speed compensation amount which is an output of the compensator, and
   a second switch configured to selectively provide a stator resistance value provided by the stator resistance estimator to the rotor speed and position estimator.

7. The apparatus of claim 1, further comprising a speed controller configured to output a q axis current command on the synchronous reference frame to the current controller by inputting a rotor speed command and rotor speed of the induction motor.

* * * * *